(12) United States Patent
Rice et al.

(10) Patent No.: US 6,513,330 B1
(45) Date of Patent: Feb. 4, 2003

(54) DIFFUSER FOR A GAS TURBINE ENGINE

(75) Inventors: Edward C. Rice, Indianapolis; Kenneth W. Froemming, Carmel, both of IN (US)

(73) Assignee: Allison Advanced Development Company, Indianapolis, IN (US)

( * ) Notice: Subject to any disclaimer, the term of this patent is extended or adjusted under 35 U.S.C. 154(b) by 80 days.

(21) Appl. No.: 09/708,930

(22) Filed: Nov. 8, 2000

(51) Int. Cl.$^7$ ................................................. F02C 1/00
(52) U.S. Cl. ........................................................ 60/751
(58) Field of Search ................................ 60/751, 39.31, 60/39.32

(56) References Cited

U.S. PATENT DOCUMENTS

| | | | |
|---|---|---|---|
| 3,364,678 A | * | 1/1968 | Alford .......................... 60/751 |
| 3,750,397 A | | 8/1973 | Cohen et al. |
| 3,778,186 A | | 12/1973 | Bandukwalla |
| 3,799,694 A | | 3/1974 | Duzan |
| 4,022,541 A | | 5/1977 | Perrigo et al. |
| 4,180,972 A | | 1/1980 | Herman et al. |
| 4,272,955 A | | 6/1981 | Hoffman et al. |
| 4,458,479 A | | 7/1984 | Reider et al. |
| 4,483,149 A | | 11/1984 | Rider et al. |
| 4,503,668 A | | 3/1985 | Duncan, III et al. |
| 4,512,158 A | | 4/1985 | Striebel et al. |
| 4,796,429 A | | 1/1989 | Verdouw |
| 4,918,926 A | | 4/1990 | Nikkanen |
| 5,077,967 A | | 1/1992 | Widener et al. |
| 5,249,921 A | | 10/1993 | Stueber et al. |
| 5,592,821 A | | 1/1997 | Alary et al. |
| 5,619,855 A | | 4/1997 | Burrus |
| 5,632,141 A | | 5/1997 | Sloop et al. |
| 5,701,733 A | | 12/1997 | Lewis et al. |

* cited by examiner

Primary Examiner—Timothy S. Thorpe
Assistant Examiner—Ehud Gartenberg
(74) Attorney, Agent, or Firm—Woodard, Emhardt, Naughton, Moriarty & McNett

(57) ABSTRACT

An annular diffuser for a gas turbine engine includes inner and outer walls spaced apart to define a diffuser flow path, and a support member coupling the inner wall to the outer wall while allowing independent radial displacement therebetween. The support member includes a first end portion rigidly connected to the inner wall, and a second end portion extending outside of the diffuser flowpath and coupled to the outer wall by a radially extending pin. An aerodynamically-shaped shroud member surrounds the support member to thermally isolate the support member from the diffuser flowpath, thereby shielding the support member from transient thermal loads. The shroud member is pinned to the support member at a single axial location. A combustor dome panel is attached to the downstream end portion of the shroud member and is adapted to independently support inner and outer combustor liners in spaced relation to define a combustion chamber therebetween.

34 Claims, 6 Drawing Sheets

DIFFUSER FOR A GAS TURBINE ENGINE

This invention was made with U.S. Government support under contract number F33615-97-C-2778 awarded by the United States Air Force, and the U.S. Government may have certain rights in the invention.

BACKGROUND OF THE INVENTION

The present invention relates generally to gas turbine engines. More particularly, the present invention relates to a diffuser for disposition between the compressor and combustor of a gas turbine engine. Although the present invention was developed for use in a gas turbine engine, certain applications of the invention may fall outside of this field.

A gas turbine engine is typical of the type of turbo machinery in which the present invention may be advantageously employed. It is well known that a gas turbine engine conventionally comprises a compressor for compressing a fluid, such as air, to an increased pressure. In a typical gas turbine engine, increased pressure fluid from the compressor is passed through a diffuser which conditions the fluid for subsequent combustion in the combustor.

The conditioned fluid is intermixed with fuel, ignited and burned in the combustor to generate a high temperature, relatively low pressure gaseous flow stream. The gaseous flow stream flows through a combustion chamber, where it is discharged and directed by a series of turbine vanes to a series of turbine blades. The turbine blades convert the thermal energy from the high temperature gaseous flow stream into rotational kinetic energy, which in turn is utilized to develop shaft power to drive mechanical components such as the compressor, fan, propeller, output shaft or other such devices. Alternatively, the high temperature gaseous flow stream may be used directly as a thrust for providing motive force, such as in a turbine jet engine.

Many prior diffusers include rigidly connected inner and outer walls that are typically formed as single-piece castings. Loads are transferred between the inner and outer walls through a series of struts formed integral therewith and disposed within the diffuser flowpath. Because of differing rates of thermal expansion between the inner and outer walls, significant thermal stresses are developed within the struts and at the point of connection between the struts and the inner and outer walls during operation of the engine. One approach to minimize the thermal stresses is to increase the width of the struts. Wider struts respond slower to thermal transients, thereby minimizing gradients across the strut, and are capable of carrying larger loads than thinner struts. However, increasing strut width correspondingly increases flow blockage in the diffuser flowpath, which may lead to increased disruption in air flow and a corresponding reduction in engine efficiency.

The profile tolerance and surface finish of the aerodynamic flowpath defined by the inner and outer diffuser walls in a cast single-piece diffuser is often not satisfactory to meet the design parameters for conditioning the compressed air exiting the compressor. The inconsistencies in profile tolerance result in unsatisfactory pressure changes and the surface finish in many single-piece diffusers creates aerodynamic drag which has the effect of reducing engine efficiency. A technique sometimes used to improve the profile tolerance and surface finish of the aerodynamic flowpath is to machine the interior surfaces of the diffuser. However, such machining is difficult due to the nature of single-piece castings, and also has the effect of greatly increasing the cost of the diffuser.

Thus, a need remains for further contributions in the area of diffuser technology. The present invention satisfies this need in a novel and non-obvious way.

SUMMARY OF THE INVENTION

One form of the present invention contemplates a diffuser for a gas turbine engine having first and second structures and a member coupled therebetween to maintain the first and second structures in spaced relation while allowing relative displacement therebetween in at least one direction.

In another form of the present invention, a diffuser for a gas turbine includes a diffuser having an inner wall spaced from an outer wall to define an annular flowpath, and a plurality of struts coupled between the inner and outer walls to maintain the inner and outer walls in spaced relation while allowing the inner and outer walls to float relative to one another in a radial direction.

In a further form, a diffuser for a gas turbine engine is provided, including first and second flowpath structures, a strut coupled to the first and second flowpath structures to maintain the structures in spaced relation to define a flowpath, and a shroud member extending into the flowpath and positioned adjacent the strut to shield at least a portion of the strut from fluid flowing through the flowpath.

In yet another form, a diffuser for a gas turbine engine is provided, including an inner wall, an outer wall spaced from the inner wall to define a flowpath, and means for transmitting loads between the inner and outer walls while allowing substantially unrestrained relative movement therebetween in at least one direction.

One object of the present invention is to provide a unique diffuser for a gas turbine engine.

Further forms, embodiments, objects, features and aspects of the present invention shall become apparent from the drawings and descriptions provided herein.

DESCRIPTION OF THE PREFERRED EMBODIMENTS

Figure 1:
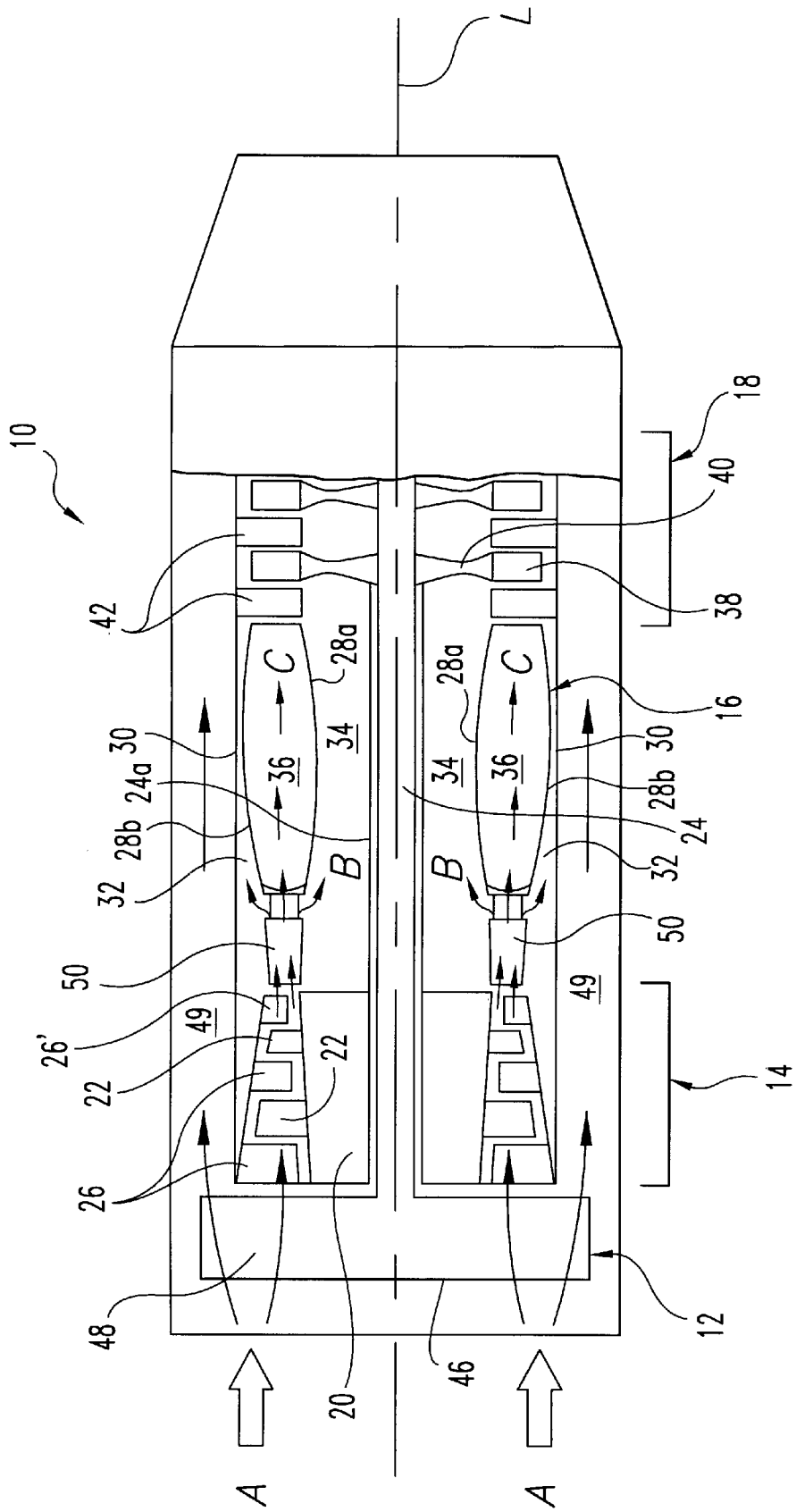
FIG. 1 is a schematic representation of a gas turbine engine.

For the purposes of promoting an understanding of the principals of the invention, reference will now be made to the embodiment illustrated in the drawings and specific language will be used to describe the same. It will nevertheless be understood that no limitation of the scope of the invention is hereby intended, and any alterations and further modifications of the illustrated device, and any further applications of the principals of the invention as illustrated herein being contemplated as would normally occur to one skilled in the art to which the invention relates.

With reference to FIG. 1, there is illustrated a schematic representation of a gas turbine engine 10. Gas turbine engine 10 includes a longitudinal axis L extending along the gaseous flow stream and has a generally annular configuration; however, other configurations are also contemplated as would occur to one of ordinary skill in the art. Gas turbine engine 10 includes a fan section 12, a compressor section 14, a combustor section 16, and a turbine section 18 integrated to produce an aircraft flight propulsion engine. This particular type of gas turbine engine is generally referred to as a turbo-fan. Another form of a gas turbine engine includes a compressor section, a combustor section, and a turbine section integrated to produce an aircraft flight propulsion engine without a fan section.

It should be understood that the term aircraft is generic, and includes helicopters, airplanes, missiles, unmanned space devices and other substantially similar devices. It is also important to realize that there are a multitude of ways in which gas turbine engine components can be linked together to produce a flight propulsion engine. For instance, additional compressor and turbine stages could be added with intercoolers connected between the compressor stages. Moreover, reheat combustion chambers could be added between the turbine stages. It should also be understood that the invention described herein is applicable to all types of gas turbine engines and is not intended to be limited herein to the gas turbine engine schematic represented in FIG. 1. For example, a gas turbine engine is equally suited to be used in industrial applications, such as pumping sets for gas and oil transmission lines, electricity generation, and naval propulsion.

The multi-stage compressor section 14 includes a rotor 20 having a plurality of compressor blades 22 coupled thereto. The rotor 20 is affixed to a shaft 24a that is rotatable within the gas turbine engine 10. A plurality of compressor vanes 26 are positioned adjacent the compressor blades 22 to direct the flow of gaseous fluid through the compressor section 14. In one form of the present invention, the gaseous fluid is air; however, other fluids are also contemplated as being within the scope of the present invention. Located at the downstream end of the compressor section 14 is a series of compressor outlet vanes 26' for directing the flow of air into an annular diffuser 50. The diffuser 50 conditions the compressed air and discharges the conditioned air into the combustor section 16 for subsequent combustion.

The combustor section 16 includes inner and outer combustor liners 28a, 28b. In one form of the present invention, the liners 28a, 28b are radially spaced apart to define an annular combustion chamber 36 therebetween. The outer combustor liners 28b is spaced from an outer casing or housing 30 to define an annular fluid passage 32. The inner combustor liner 28a is spaced from the shaft 24a, or alternatively from an inner casing (not shown), to define an annular fluid passage 34. Turbine section 18 includes a plurality of turbine blades 38 coupled to a rotor disk 40, which in turn is affixed to the shaft 24. A plurality of turbine vanes 42 are positioned adjacent the turbine blades 38 to direct the flow of a hot gaseous fluid stream generated by combustor section 16 through turbine section 18. In one form of the present invention, the hot gaseous fluid stream is air; however, the hot gaseous fluid stream could also be, but is not limited to Hydrogen and/or Oxygen.

In operation, the turbine section 18 provides rotational power to shafts 24 and 24a, which in turn drive the fan section 12 and the compressor section 14, respectively. The fan section 12 includes a fan 46 having a plurality of fan blades 48. Air enters the gas turbine engine 10 in the direction of arrows A, passes through fan section 12, and is fed into the compressor section 14 and a bypass duct 49. The compressed air exiting the compressor section 14 is routed into the diffuser 50. The diffuser 50 conditions the compressed air and directs the conditioned air into combustion chamber 36 and the annular fluid passages 32, 34 in the direction of arrows B. A substantial portion of the conditioned air enters the combustion chamber 36 at its upstream end where the conditioned air is intermixed with fuel in a conventional manner to provide an air/fuel mixture. The air/fuel mixture is then ignited and burned to generate the hot gaseous fluid stream.

The hot gaseous fluid stream flows through the combustion chamber 36 in the direction of arrows C. The fluid stream exits the aft end of the combustor section 16 where it is fed into the turbine section 18 to provide the energy necessary to power gas turbine engine 10. The remaining portion of the conditioned air exiting diffuser 50 flows through the fluid passages 32, 34 to cool the combustor liners 28a, 28b and other engine components. Further details regarding the general structure and operation of a gas turbine engine are believed well known to those skilled in the art and are therefore deemed unnecessary for a full understanding of the principles of the present invention.

Figure 2:
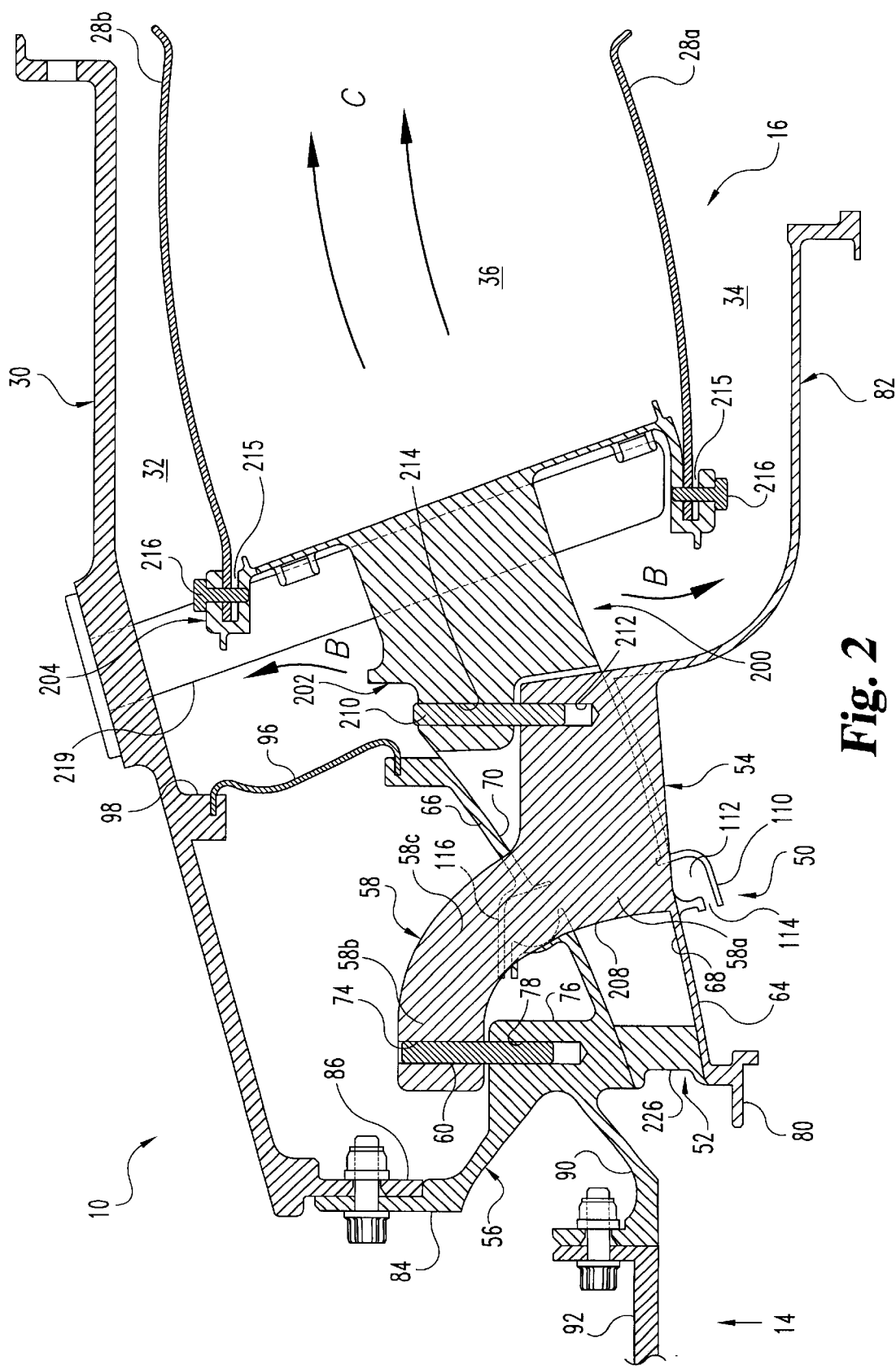
FIG. 2 is a partial sectional view of a portion of a gas turbine engine at the interface between the compressor and combustor sections, illustrating a diffuser according to one embodiment of the present invention.

Referring now to FIG. 2, there is illustrated a cross sectional view of a portion of gas turbine engine 10, showing diffuser section 50 disposed between the compressor section 14 and the combustor section 16. Diffuser 50 is adapted to receive an increased pressure fluid, such as air, from the compressor section 14 and direct at least a portion of the fluid into combustor section 16 for subsequent combustion within combustion chamber 36. In one form of the present invention, diffuser 50 extends about the longitudinal axis L of engine 10 to define an annular flowpath 52. However, it should be understood that other shapes and configurations of diffuser 50 are also contemplated as would occur to one of ordinary skill in the art.

Figure 3:
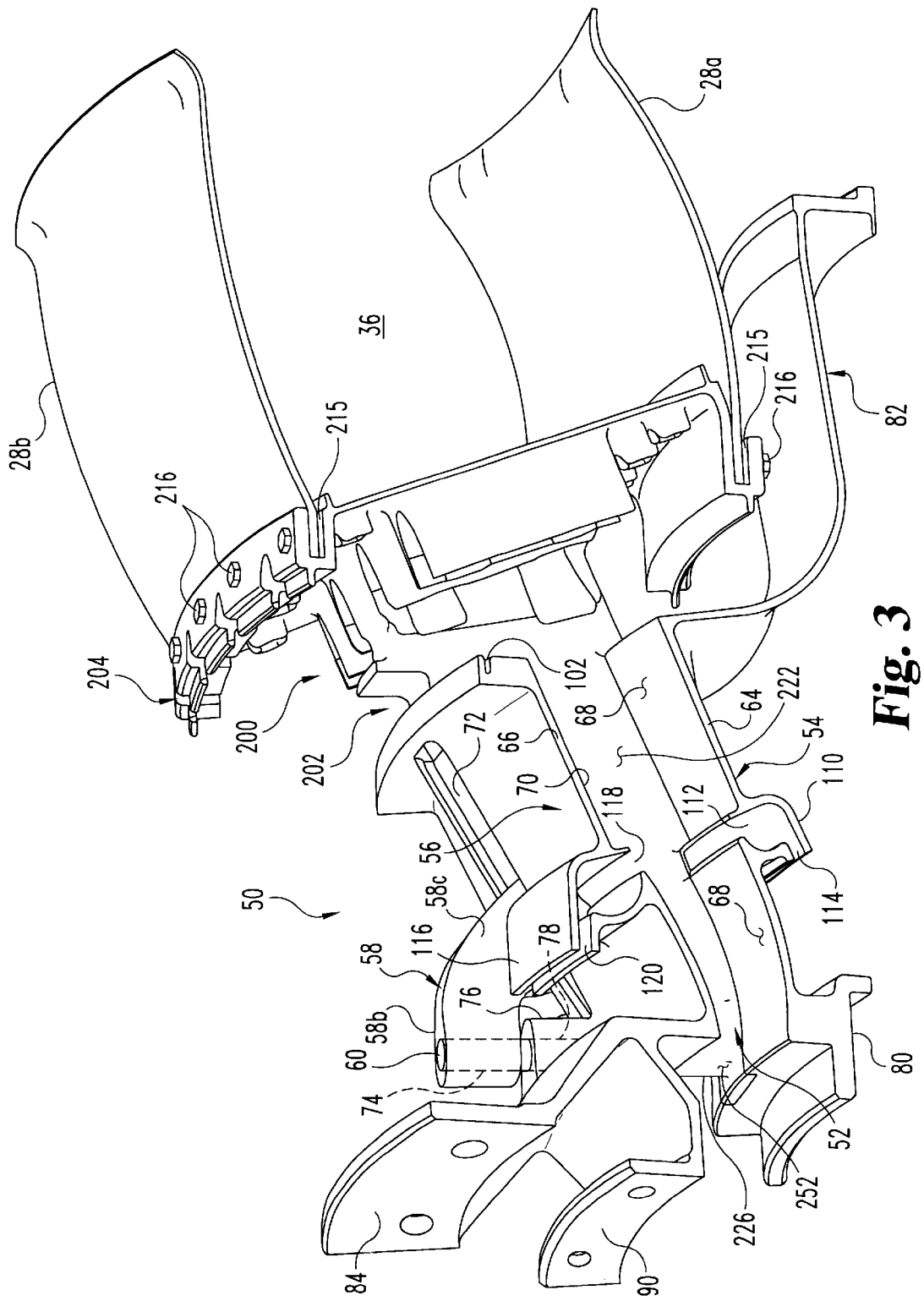
FIG. 3 is a side perspective view of the diffuser illustrated in FIG. 2.
Figure 4:
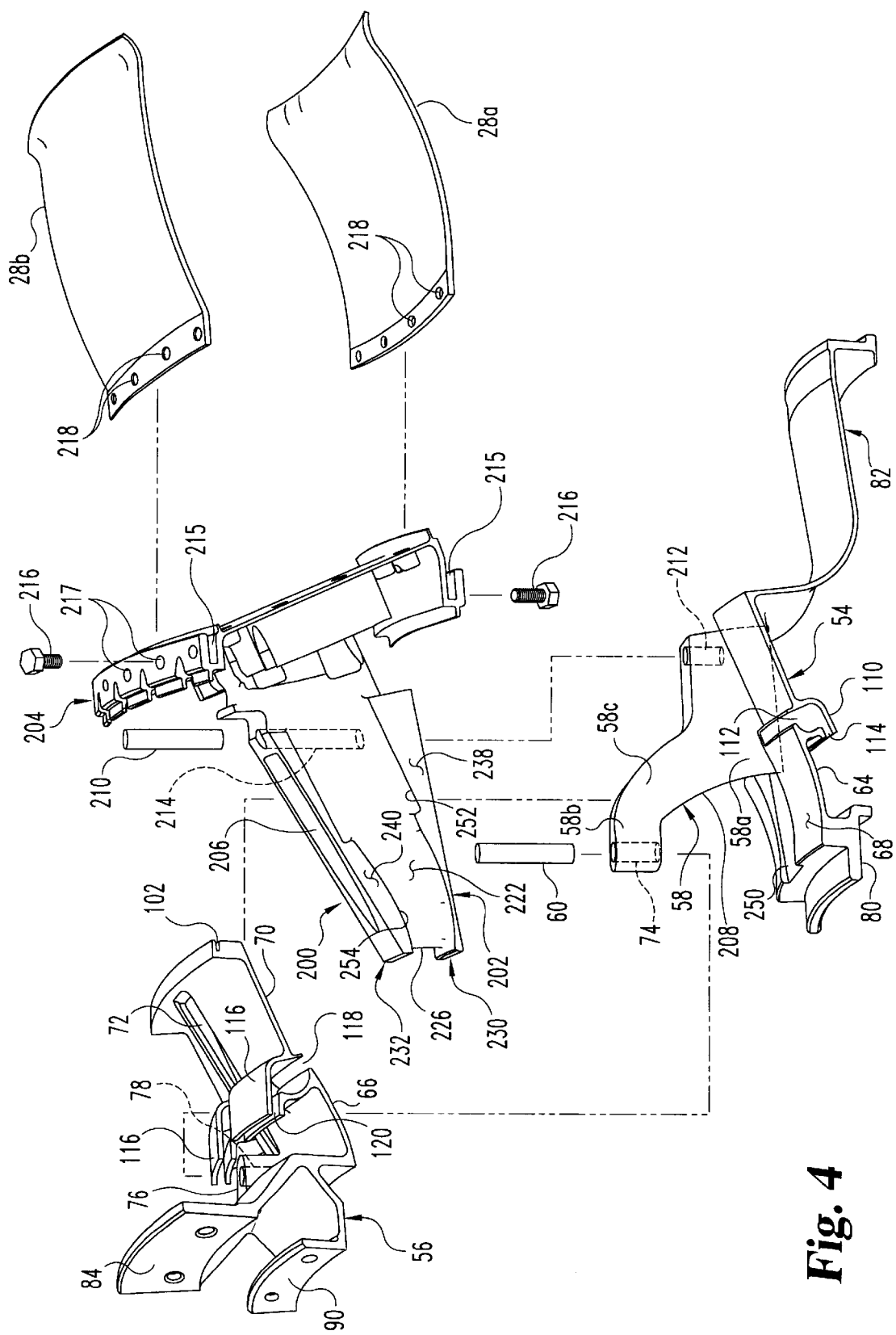
FIG. 4 is an exploded side perspective view of the diffuser illustrated in FIG. 3.

Referring collectively to FIGS. 2–4, each circumferential section of diffuser 50 is generally comprised of an inner flowpath structure 54, an outer flowpath structure 56 and a support member or strut 58. In one form of the present invention, the inner flowpath structure 54 is spaced radially from outer flowpath structure 56 to define annular flowpath 52 therebetween. Inner flowpath structure 54 is coupled to outer flowpath structure 56 by way of the strut 58. Strut 58 extends outwardly from the inner flowpath structure 54 and is connected to the outer flowpath structure 56 by a pin 60. It should be understood that other structures are also contemplated for coupling inner and outer flowpath structures 54, 56, such as, for example, a bolt or another type of fastener. It should further be understood that the components of diffuser 50 may be formed of conventional materials as would be known to one of ordinary skill in the art; materials such as, but not limited to, Waspalloy, Inconel.

Inner and outer flowpath structures 54, 56 include axially and circumferentially extending inner and outer wall portions 64, 66, respectively. Inner and outer wall portions 64, 66 are spaced radially apart and preferably taper outwardly relative to one another in the direction of fluid flow to define a diverging annular flowpath 52. Increased pressure fluid discharged from the compressor section 14 has a high fluid velocity, and hence a correspondingly high dynamic head. The diverging annular flowpath 52 allows the increased pressure fluid to expand and decelerate to a lower fluid velocity, thereby decreasing the dynamic pressure and correspondingly increasing static pressure. In this manner, diffuser 50 conditions the fluid for subsequent combustion within combustion chamber 36. Since the inner and outer flowpath structures 54, 56 of diffuser 50 are separate structures, the flowpath surfaces 68, 70 are readily accessible and can be easily worked or machined to more accurately control surface roughness. In one form of the present invention, the surface finish of flowpath surfaces 68, 70 is preferably in a range of about 32 to about 64 microns.

As discussed above, the inner flowpath structure 54 is coupled to the outer flowpath structure 56 by way of strut 58. Strut 58 maintains the flowpath structures 54, 56 in spaced relation and serves to transmit loads between flowpath structures 54, 56 while allowing independent displacement therebetween. In one form of the present invention, the independent displacement is in a generally radial direction. In one embodiment of diffuser 50, strut 58 includes a first end portion 58a connected to the inner flowpath structure 54, a second end portion 58b pinned to the outer flowpath structure 56, and an intermediate neck portion 58c interconnecting the first and second end portions 58a, 58b. However, it should be understood that other shapes and configurations of strut 58 are also contemplated as would occur to one of ordinary skill in the art. Additionally, it should be understood that strut 58 could alternatively be pinned to the inner flowpath structure 54 and connected to the outer flowpath structure 56, or pinned to each of the inner and outer flowpath structures 54, 56.

In one form of diffuser 50, the first end portion 58a of strut 58 extends outwardly from inner wall portion 64 in a generally radial direction and is substantially rigidly attached thereto by any method known to one of ordinary skill in the art, such as, for example, by welding or fastening or integrally cast. The outer wall portion 66 of outer flowpath structure 56 defines an aperture or slot 72 having a length extending in a generally axial direction and being sized to receive the second end portion 58b and neck portion 58c of strut 58 therethrough. Second end portion 58b defines an opening 74 extending in a generally radial direction and sized to receive pin 60 therein. The outer flow path structure 56 includes a shoulder 76 extending outwardly from outer wall portion 66 and defining an opening 78 extending in a generally radial direction, also being sized to receive pin 60 therein. Preferably, radial openings 74, 78 each have a diameter sized slightly larger than the outer diameter of pin 60 to provide a snug fit therebetween, while still allowing sliding movement between pin 60 and at least one of the radial openings 74, 78.

The inner and outer flowpath structures 54, 56 are interconnected by inserting the neck portion 58c of strut 58 within slot 72 and positioning the second end portion 58b radially adjacent shoulder 76, outside of diffuser flowpath 52, with radial opening 74 aligned with radial opening 78. Pin 60 is inserted within radial openings 74, 78 to radially and axially couple strut 58 to the outer flowpath structure 56, which correspondingly couples the inner and outer flow path structures 54, 56 while allowing independent radial displacement therebetween. In the illustrated embodiment, pin 60 has a substantially circular outer cross section; however, it should be understood that pin 60 could alternatively be configured as a bolt having a head portion disposed outwardly adjacent second end portion 58b and a threaded shank portion extending through opening 74 and adapted to engage internal threads defined in opening 78.

Because the radial moment of inertia and/or thermal coefficient of strut 58 and flowpath structure 54, 56 may differ, each may radially expand and contract at different rates during thermal cycling of gas turbine engine 10. However, the non-rigid connection between strut 58 and outer flowpath structure 56 allows for independent radial expansion and contraction of the inner and outer flowpath structures 54, 56 to accommodate for thermal transients within gas turbine engine 10. Since the flowpath structures 54, 56 are permitted to float relative to one another, the buildup of thermal stresses within diffuser 50 is minimized.

Referring to FIG. 2, in addition to being interconnected by strut 58, the inner and outer flowpath structures 54, 56 may also be secured to adjacent structures or components of gas turbine engine 10. In one form of the present invention, the upstream end portion of inner flowpath structure 54 includes a mounting flange 80 which may be attached, for example, to the compressor housing. The inner flowpath structure 54 is preferably integrally formed with an inner combustor casing 82 to define a single piece structure. The upstream end portion of outer flowpath structure 56 includes a first mounting flange 84 attached to a radially extending flange 86 of outer casing 30 by a number of fasteners, and a second mounting flange 90 attached to a corresponding flange 92 of the compressor housing by a number of fasteners. In one embodiment of the invention, an annular sealing element 96 extends between the downstream end portion of outer flowpath structure 56 and a radial shoulder 98 extending inwardly from outer casing 30. The function of sealing element 96 will be discussed in greater detail below.

Referring to FIGS. 3 and 4, in one form of the present invention, the inner flowpath structure 54 includes a pair of circumferentially extending bleed passages 110 disposed on opposite sides of strut 58. Each bleed passage 110 has a fluid inlet 112 opening onto inner flowpath surface 68, and an upstream facing fluid outlet 114. Similarly, outer flowpath structure 56 includes a pair of circumferentially extending bleed passages 116 disposed on opposite sides of slot 72. Each bleed passage 116 has a fluid inlet 118 opening onto outer flowpath surface 70, and an upstream facing fluid outlet 120. A portion of the increased pressure fluid flowing through annular flowpath 52 is bled off through fluid inlets 112, 118 and is directed through bleed passages 110, 116 to fluid outlets 114, 120. The bleed-off fluid may then be directed through a suitable duct or conduit (not shown) to a point of use. The bleed-off fluid may be used, for example, as turbine cooling air, as a means to power various engine accessories, or for aircraft cabin pressurization. It should be understood that other configurations of bleed passages 110, 116 are also contemplated as would occur to one of ordinary skill in the art, or that bleed passages 110, 116 could be eliminated from diffuser 50 all together.

In one form of the present invention, gas turbine engine 10 is equipped with a number of combustor support members 200, each comprising an axially extending shroud portion 202 and a dome portion 204. In one embodiment, the number of shroud portions 202 is equal to the number of struts 58, and the dome portions 204 of adjacent support members 200 are interconnected to form a substantially continuous annular combustor dome panel. Preferably, the shroud portion 202 and the dome portion 204 are integrally formed, defining a unitary, single piece structure. However, it is also contemplated that the shroud and dome portions 202, 204 may be formed separately and interconnected by any method know to those of skill in the art, such as, for example, by welding or fastening or integrally cast. The components of combustor support member 200 may be formed of conventional materials as would be known to one of ordinary skill in the art; materials such as, but not limited to, Mar-M-247, Waspalloy.

As most clearly shown in FIG. 4, shroud portion 202 is configured to surround at least a portion of a corresponding strut 58. More specifically, shroud portion 202 defines a radially extending passage or slot 206 sized to receive at least a portion of strut 58 therein to substantially separate strut 58 from diffuser flowpath 52. By thermally isolating strut 58 from the fluid flowing through diffuser flowpath 52, thermal gradients across strut 58 are reduced, particularly during acceleration and deceleration of engine 10. Because the leading edge 208 of strut 58 would otherwise be exposed to the direct impingement of fluid, the leading edge 208 is shielded from flowpath 52 to minimize thermal gradients across strut 58. It should be understood that the phrase "thermally isolate", as used herein, does not necessarily mean the complete absence of heat transfer, but instead is meant to include the substantial separation or isolation of a structure from fluid flow.

Shroud portion 202 is coupled to the inner flowpath structure 54 at a single axial location by way of a pin 210 extending between an opening 212 in strut 58 and an opening 214 in shroud portion 202. In one embodiment, each opening 212, 214 extends in a generally radial direction and has a diameter slightly larger than the outer diameter of pin 210 to provide a snug fit while still allowing sliding movement between pin 210 and at least one of the openings 212, 214. It should be understood that pin 210 could alternatively be configured as a bolt, having a threaded shank portion extending through opening 214 and adapted to engage internal threads defined in opening 212. By pinning shroud portion 202 to strut 58 at a single axial location, rather than at multiple axial locations, axially induced thermal stresses are reduced, if not eliminated entirely. Additionally, because shroud portion 202 is not rigidly coupled to either of inner and outer flowpath structures 54, 56 in a radial direction, thermal stresses within diffuser 50 are also reduced.

The dome portion 204 of support member 200 is configured to support inner and outer combustor liners 28a, 28b in spaced relation to define combustion chamber 36. Although the combustor section 16 is illustrated and described as having an annular configuration, it should be understood that the present invention is also applicable to combustors having other configurations, such as a can or cannular configuration.. In one form of the present invention, the inner and outer liners 28a, 28b are independently attached to dome portion 204, with the upstream ends of liners 28a, 28b inserted within circumferentially and axially extending grooves 215 formed in dome portion 204. A number of fasteners 216 are extended through aligned pairs of radial openings 217, 218 defined in dome portion 204 and the upstream ends of liners 28a, 28b, respectively. Liner loads are taken out through the integral dome/shroud portions 202, 204 of combustor support member 200. The liner loads are carried by the shroud portion 204 and are transferred to the inner and outer flowpath structures 54, 56. In addition to supporting liners 28a, 28b, the dome portion 204 is also configured to support a number of fuel spraybars or nozzles 219 (FIG. 2) which are used to inject fuel into combustion chamber 36, the details of which will be discussed below.

Figure 5A:
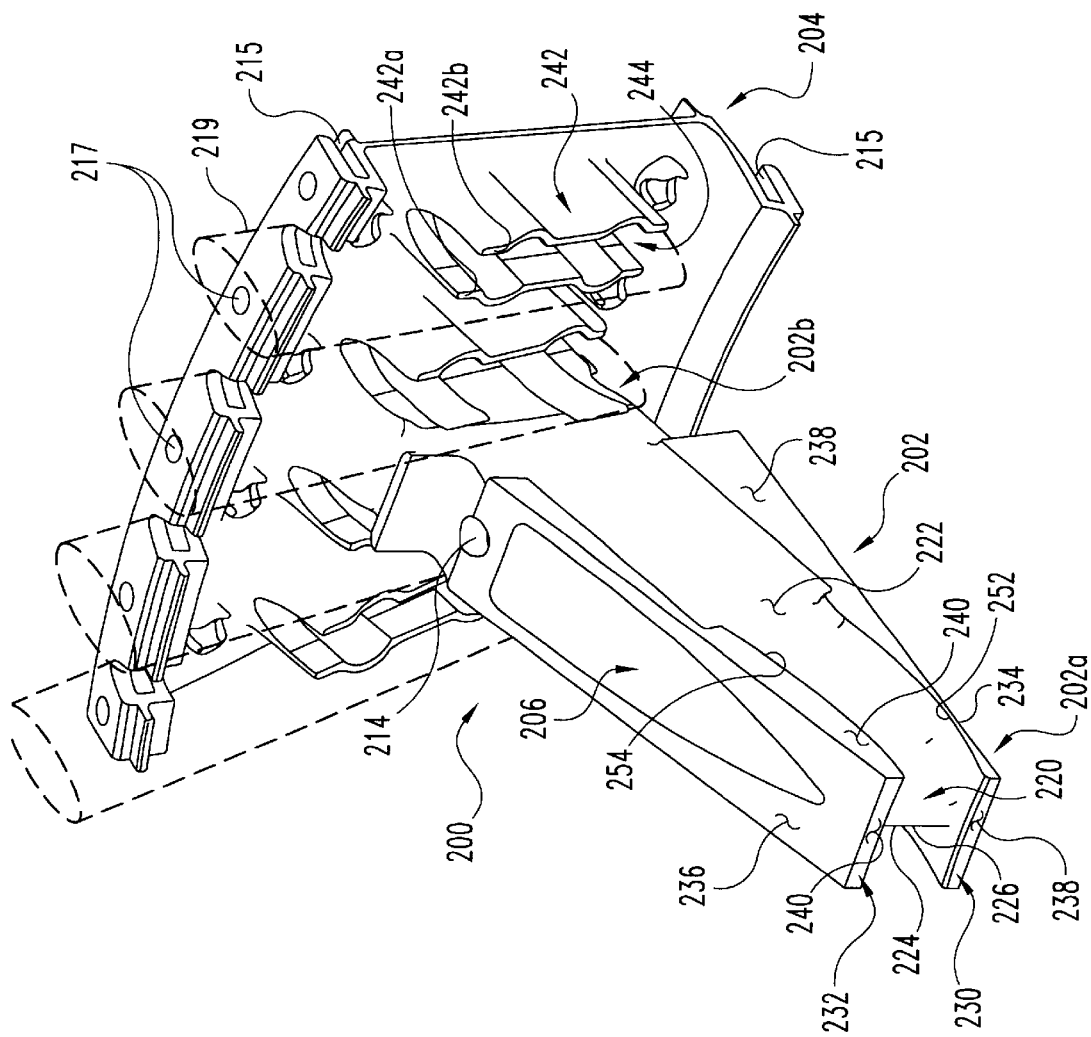
FIG. 5a is a rear perspective view of the combustor support member illustrated in FIGS. 2–4.
Figure 5B:
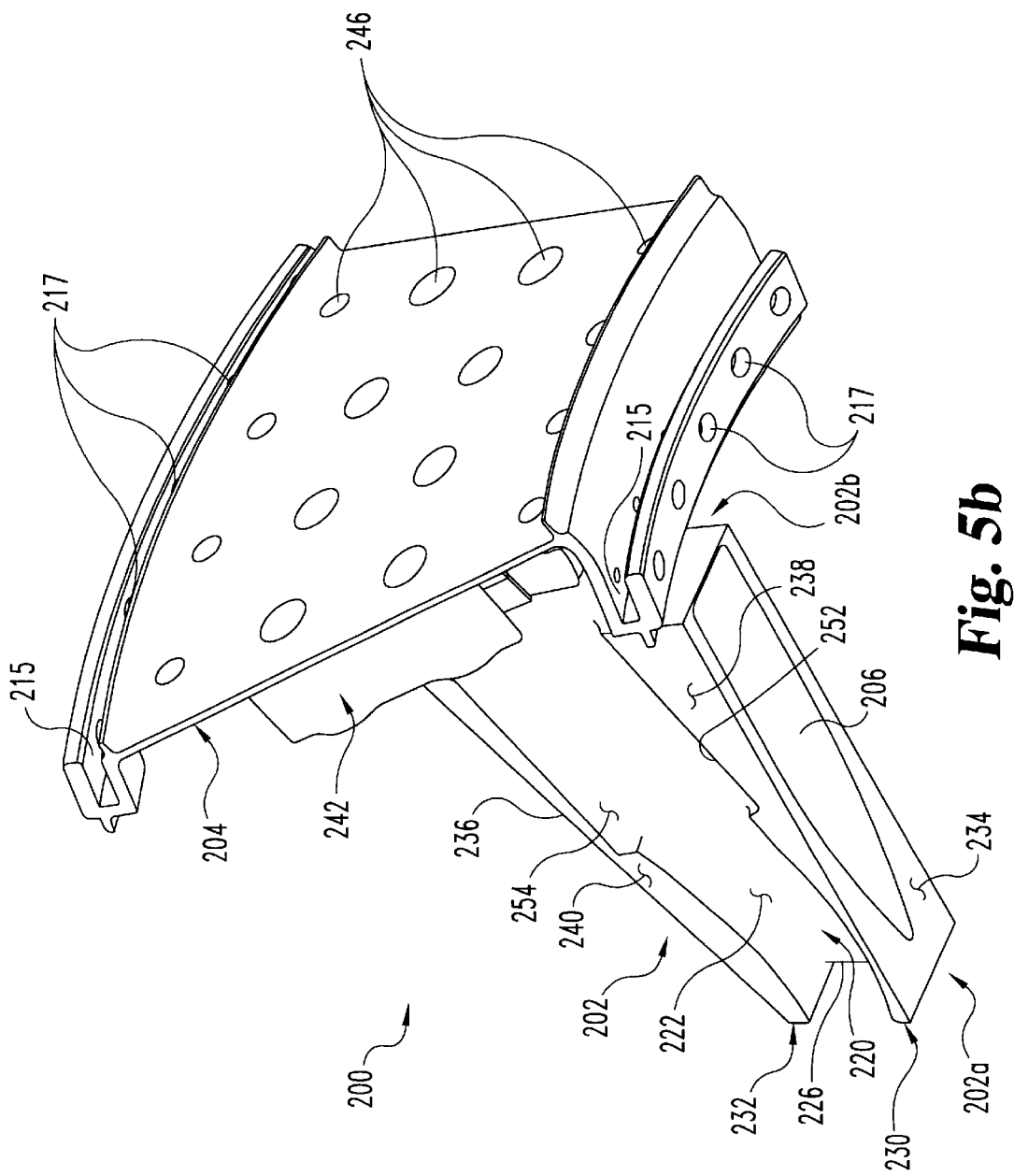
FIG. 5b is a front perspective view of the combustor support member illustrated in FIGS. 2–4.

Referring now to FIGS. 5a and 5b, shown therein are further details regarding combustor support member 200. Notably, shroud portion 202 has an aerodynamic shape to minimize fluid turbulence and aerodynamic drag. More specifically, shroud portion 202 has an upstream end portion 202a, a downstream end portion 202b, and a web portion 220 extending between end portions 202a, 202b. Web portion 220 includes a pair of opposite, laterally facing surfaces 222, 224 which converge at upstream end portion 202a to define a leading edge 226 and taper away from one another as they extend toward downstream end portion 202b to define an aerodynamic V-shape. In the illustrated embodiment, leading edge 226 is pointed; however, it should be understood that leading edge 226 can also take on other configurations, such as, for example, a flat or round shape. Similar to inner and outer flowpath surfaces 68, 70, lateral surfaces 222, 224 are directly exposed to the fluid flowing through diffuser flowpath 52, and are therefore preferably machined or worked to reduce surface roughness.

Shroud portion 202 also includes axially extending inner and outer flange portions 230, 232 disposed at opposite ends of web portion 220. Flange portions 230, 232 in turn define inner and outer surfaces 234, 236, respectively, which diverge away from one another as they extend from upstream end portion 202a toward downstream end portion 202b. Flange portions 230, 232 respectively define peripheral edges 238, 240, extending about inner and outer surfaces 234, 236, respectively. Slot 206 opens onto each of the inner and outer surfaces 234, 236 and extends axially along a substantial portion of the length of shroud portion 202. In one embodiment of shroud portion 202, slot 206 has a shape corresponding to the outer profile of lateral surfaces 222, 224 so as to define a substantially uniform wall thickness of web portion 220.

As most clearly shown in FIG. 5a, dome portion 204 includes a series of spraybar guides 242, each defining a pair of oppositely disposed flanges 242a, 242b spaced apart to define a channel 244 sized to receive a corresponding spraybar 219 therein. Spraybar guides 242 aid in maintaining spraybars 219 in a predetermined position and orientation while allowing for relative movement between dome portion 204 and spraybars 219. As most clearly shown in FIG. 5b, dome portion 204 also defines a series of fuel delivery openings 246 disposed in radial alignment with corresponding spraybar guides 242. Fuel is delivered through spraybars 219 in a conventional manner, and is injected or sprayed into combustion chamber 36 through fuel delivery openings 246. Air flows between the spraybar 219 and gaps in spraybar guide 242. The air flows into the combustion chamber 36 through the plurality of holes 246. At the same time fuel is introduced into the airstream flowing through the holes 246. Further details regarding combustor support member 200 are disclosed in co-pending patent application Ser. No. 09/708,945 filed on Nov. 8, 2000, by inventors Rice and Pack. This co-pending patent application is hereby expressly incorporated by reference for its entire disclosure.

Referring once again to FIG. 4, reference will now be made to one method of assembling diffuser 50, combustor support member 200, and combustor liners 28a, 28b. However, it should be understood that other methods of assembly are also contemplated as being within the scope of the invention. Initially, strut 58 is inserted within slot 206 and the inner flange portion 230 of shroud portion 202 is positioned within an axially extending notch 250 defined along inner flowpath surface 68. In one embodiment, notch 250 has a profile substantially complimentary to the peripheral edges 238 of inner flange portion 230. When inner flange portion 230 is completely inserted within axial notch 250, the outwardly facing surface 252 of lower flange portion 230 is positioned substantially flush with the inner flowpath surface 68 to provide a relatively smooth transition between shroud portion 202 and inner flowpath structure 54 (FIG. 3). Combustor support member 200 is then axially and radially coupled to inner flowpath structure 54 by inserting pin 210 within aligned openings 212, 214.

Following the assembly of inner flowpath structure 54 and combustor support member 200, the second end portion 58b and neck portion 58c of strut 58 are passed through slot 72 of outer flowpath structure 56. The outer flange portion 232 of shroud portion 202 is then positioned within an axially extending notch (not shown) defined along outer flowpath surface 70. In one embodiment, the axial notch has a profile substantially complementary to the peripheral edges 240 of outer flange portion 232. When outer flange portion 232 is completely inserted within the axial notch, the inwardly facing surface 254 of upper flange portion 232 is positioned substantially flush with the outer flowpath surface 70 to provide a relatively smooth transition between shroud portion 202 and outer flowpath structure 56. Outer flowpath structure 56 is then axially and radially coupled to strut 58 by positioning the second end portion 58b of strut 58 outwardly adjacent the radially extending shoulder 76 of outer flowpath structure 56 and inserting pin 60 through aligned openings 74, 78.

The inner and outer combustor liners 28a, 28b are attached to dome portion 204 by inserting the upstream ends of liners 28a, 28b within axial grooves 215 and aligning the openings 217 in dome portion 204 with the openings 218 in liners 28a, 28b. Fasteners 216 are passed through aligned openings 217, 218 to independently attach inner and outer combustor liners 28a, 28b to dome portion 204. Referring once again to FIG. 2, although a substantial portion of the conditioned air exiting diffuser 50 enters combustion chamber 36, a portion of the air is directed to the annular fluid passages 32, 34 arranged about the exterior of combustor liners 28a, 28b. Sealing element 96 serves to aid in directing a portion of the air from diffuser 50 to fluid passage 32. Similarly, the upstream portion of combustor casing 82 aids in directing a portion of the air from diffuser 50 to fluid passage 34. The air passing through passages 32, 34 provides cooling to the combustor liners 28a, 28b and other engine components.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected. In reading the claims it is intended that when words such as "a", "an", "at least one", "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A diffuser for a gas turbine engine, comprising:
   a first structure having a first flowpath surface;
   a second structure having a second flowpath surface; and
   a support member coupled between said first and second structures to maintain said first and second flowpath surfaces in spaced relation to define a flowpath while allowing substantially unrestrained relative displacement between said first and second structures in at least one direction.

2. The diffuser of claim 1 wherein said flowpath is annular shaped and wherein said at least one direction is a radial direction.

3. The diffuser of claim 1 wherein said support member includes a first end portion substantially rigidly connected to one of said first and second structures, and a second end portion pinned to another of said first and second structures to allow said relative displacement between said first and second structures in said at least one direction.

4. The diffuser of claim 1 further comprising an isolation member disposed between said first and second structures and defining a passage extending therethrough, said support member being disposed within said passage to thermally isolate said support member from fluid flowing through said flowpath.

5. The diffuser of claim 1 wherein said support member includes a first opening and one of said first and second structures includes a second opening; and
   further comprising a pin disposed within each of said first and second openings to couple said member to said one of said first and second structures while allowing said relative displacement between said first and second structures in said at least one direction.

6. The diffuser of claim 5 wherein said support member includes an end portion defining said first opening, said one of said first and second structures having an aperture extending therethrough, said support member extending through said aperture with said end portion being disposed outside of said flowpath.

7. The diffuser of claim 6 wherein said aperture is a slot extending along said flowpath.

8. The diffuser of claim 1 wherein at least one of said first and second structures includes a passage adapted to bleed off a portion of fluid flowing through said flowpath.

9. The diffuser of claim 1 further comprising a shroud member covering at least a portion of said support member to substantially isolate said at least a portion from fluid flowing through said flowpath.

10. The diffuser of claim 9 wherein said shroud member defines a passage extending therethrough and being sized to receive said support member therein to substantially isolate said support member from said flowpath.

11. The diffuser of claim 9 wherein said at least a portion of said support member is an upstream edge, said shroud member substantially isolating said upstream edge from transient thermal loading.

12. The diffuser of claim 9 wherein said shroud member has an upstream end portion and a downstream end portion, said upstream end portion defining a leading edge tapering outwardly toward said downstream end portion.

13. The diffuser of claim 9 wherein said shroud member is pinned to said support member.

14. The diffuser of claim 9 wherein said shroud member has an upstream end portion and a downstream end portion, said shroud member including a combustor dome panel attached to said downstream end portion.

15. The diffuser of claim 14 further comprising inner and outer combustor liners spaced apart to define a combustion chamber, said inner and outer combustor liners being coupled to said combustor dome panel.

16. The diffuser of claim 15 wherein said dome panel includes a pair of spaced apart grooves, an end portion of each of said inner and outer combustor liners being captured within a respective one of said grooves.

17. The diffuser of claim 1 wherein said first and second flowpath surfaces each have a surface finish within in a range of about 32 microns to about 64 microns.

18. The diffuser of claim 1 wherein said first structure is comprised of a plurality of circumferential segments interconnected to form a first annular member, said second structure being comprised of a plurality of circumferential segments interconnected to form a second annular member, said first and second annular members being positioned in spaced relation by a plurality of said support members to define an annular flowpath while allowing substantially unrestrained relative displacement between said first and second annular members in a radial direction.

19. A diffuser for a gas turbine engine, comprising:

an inner wall;

an outer wall spaced from said inner wall to define an annular flowpath; and a plurality of struts coupled between said inner and outer walls to maintain said inner and outer walls in spaced relation while allowing said inner and outer walls to float relative to one another in a radial direction.

20. The gas turbine engine of claim 19 further comprising a plurality of isolation members, each of said isolation members being disposed about a respective one of said plurality of struts to substantially isolate said respective one of said plurality of struts from fluid flow through said annular flowpath.

21. The gas turbine engine of claim 19 wherein each of said inner and outer walls define flowpath surfaces having a surface finish within a range of about 32 microns to about 64 microns.

22. The gas turbine engine of claim 19 wherein each of said plurality of struts includes an end portion coupled to one of said inner and outer walls, said end portion including a first opening and another of said inner and outer walls including a second opening; and further comprising a plurality of pin members, each of said pin members being at least partially disposed within a corresponding pair of said first and second openings to couple each of said struts to said one of said inner and outer walls while allowing said inner and outer walls to float relative to one another in said radial direction.

23. The gas turbine engine of claim 22 wherein each of said plurality of struts includes an opposite end portion rigidly connected to said another of said inner and outer walls, said end portion defining said first opening extending through an aperture defined by said one of said inner and outer walls and being disposed outside of said annular flowpath.

24. The gas turbine engine of claim 19 wherein each of said plurality of struts is radially pinned to at least one of said inner and outer walls to axially couple said inner and outer walls while allowing independent radial displacement therebetween.

25. A diffuser for a gas turbine engine, comprising:

a first flowpath structure;

a second flowpath structure;

a strut coupled to each of said first and second flowpath structures to maintain said first and second flowpath structures in spaced relation to define a flowpath; and a shroud member extending into said flowpath and positioned adjacent said strut to shield at least a portion of said strut from fluid flowing through said flowpath.

26. The diffuser of claim 25 wherein said shroud member is disposed about a leading edge of said strut to shield said leading edge from said fluid flowing through said flowpath.

27. The diffuser of claim 26 wherein said shroud member surrounds said strut to thermally isolate said strut from said fluid flowing through said flowpath.

28. The diffuser of claim 25 wherein said shroud member has an upstream end portion and a downstream end portion, said upstream end portion defining a leading edge tapering outwardly toward said downstream end portion.

29. The diffuser of claim 25 wherein said shroud member has a first surface disposed adjacent said first flowpath structure and a second surface disposed adjacent said second flowpath structure, said shroud member including an aperture extending between said first and second surfaces, said load transfer member extending through said aperture to substantially isolate said load transfer member from said flowpath.

30. The diffuser of claim 25 wherein said shroud member has an upstream end portion and a downstream end portion, said shroud member including a combustor dome operably attached to said downstream end portion, said combustor dome supporting inner and outer combustor liners in spaced relation to define a combustion chamber.

31. The diffuser of claim 25 wherein said load transfer member couples said first flowpath structure to said second flowpath structure while allowing independent displacement therebetween.

32. The diffuser of claim 31 wherein said diffuser flowpath is annular shaped, and wherein said load transfer member is pinned to at least one of said first and second flowpath structures to allow independent displacement between said first and second flowpath structures in a radial direction.

33. A diffuser for a gas turbine engine, comprising:

an inner wall;

an outer wall spaced from said inner wall to define a flowpath; and means for transmitting loads between said inner and outer walls, said load transmitting means allowing substantially unrestrained relative movement between said inner and outer walls in at least one direction.

34. The diffuser of claim 33 further comprising means for isolating said load transmitting means from said flowpath.

* * * * *